Figure 1:
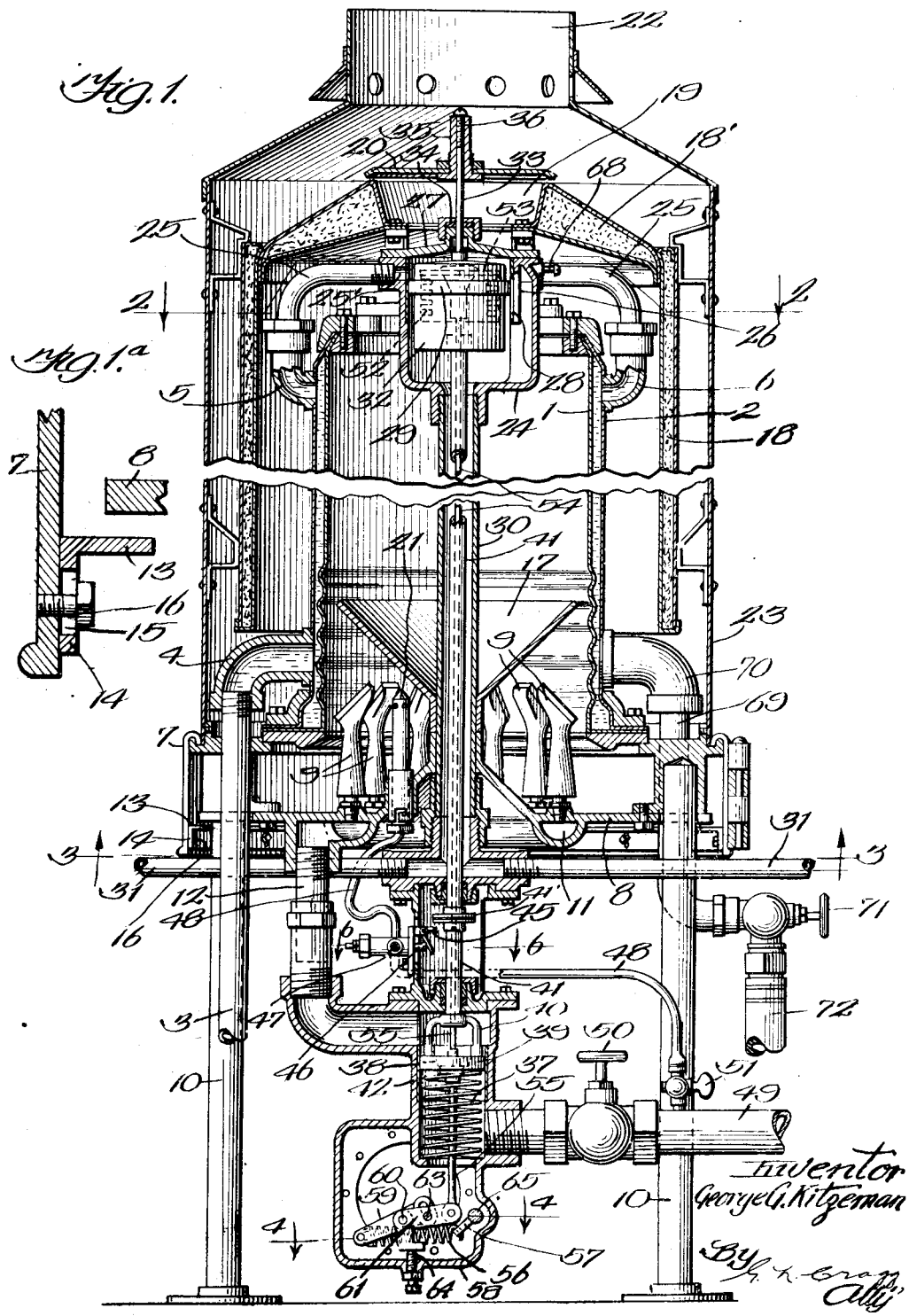

Dec. 27, 1927.　　　　　　　　　　　　　　　1,654,175
G. G. KITZEMAN
WATER HEATER
Filed Dec. 7, 1925　　　　3 Sheets-Sheet 1

Fig.1.ª

Inventor
George G. Kitzeman

Dec. 27, 1927.
G. G. KITZEMAN
WATER HEATER
Filed Dec. 7, 1925
1,654,175
3 Sheets-Sheet 2
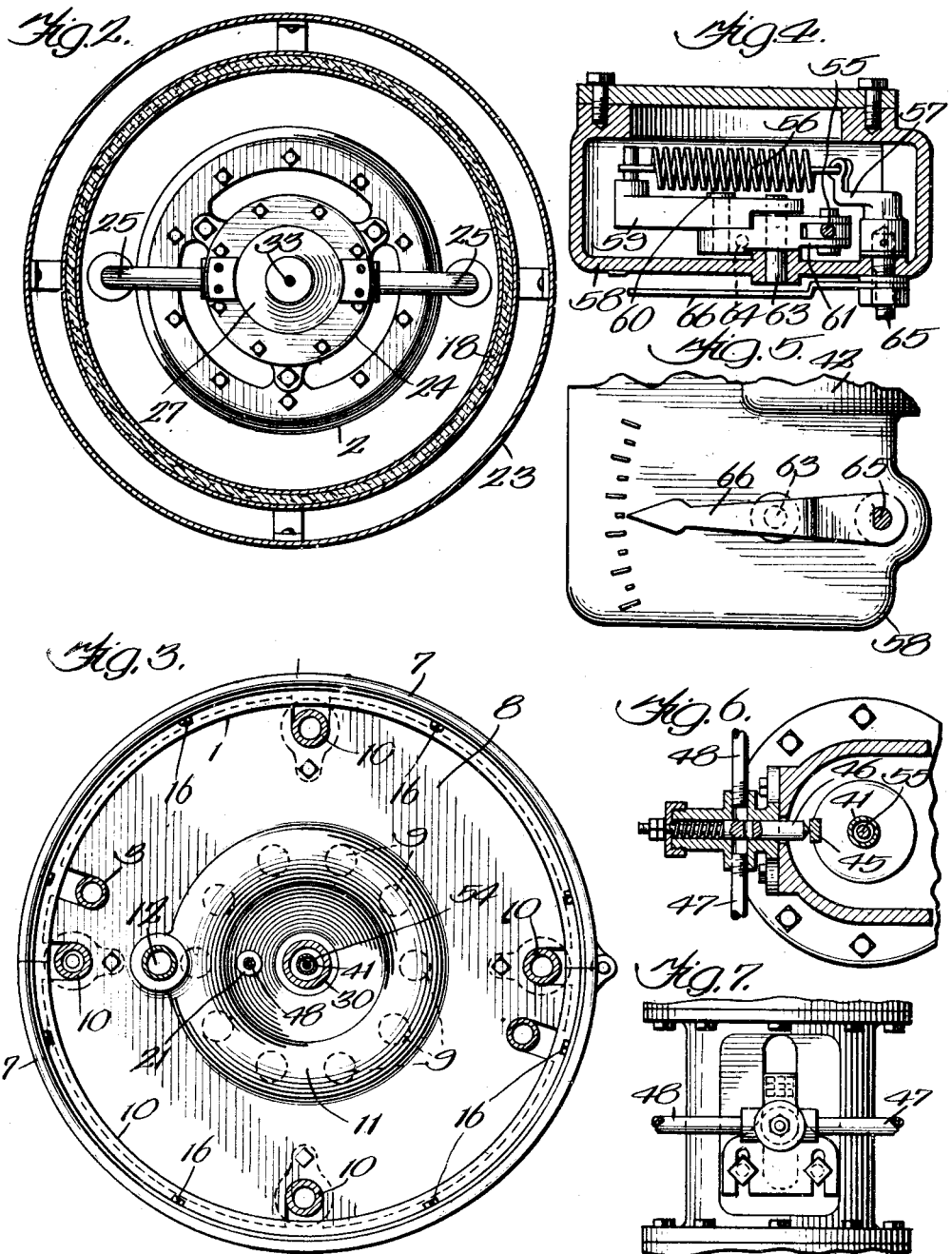
Inventor:
George G. Kitzeman

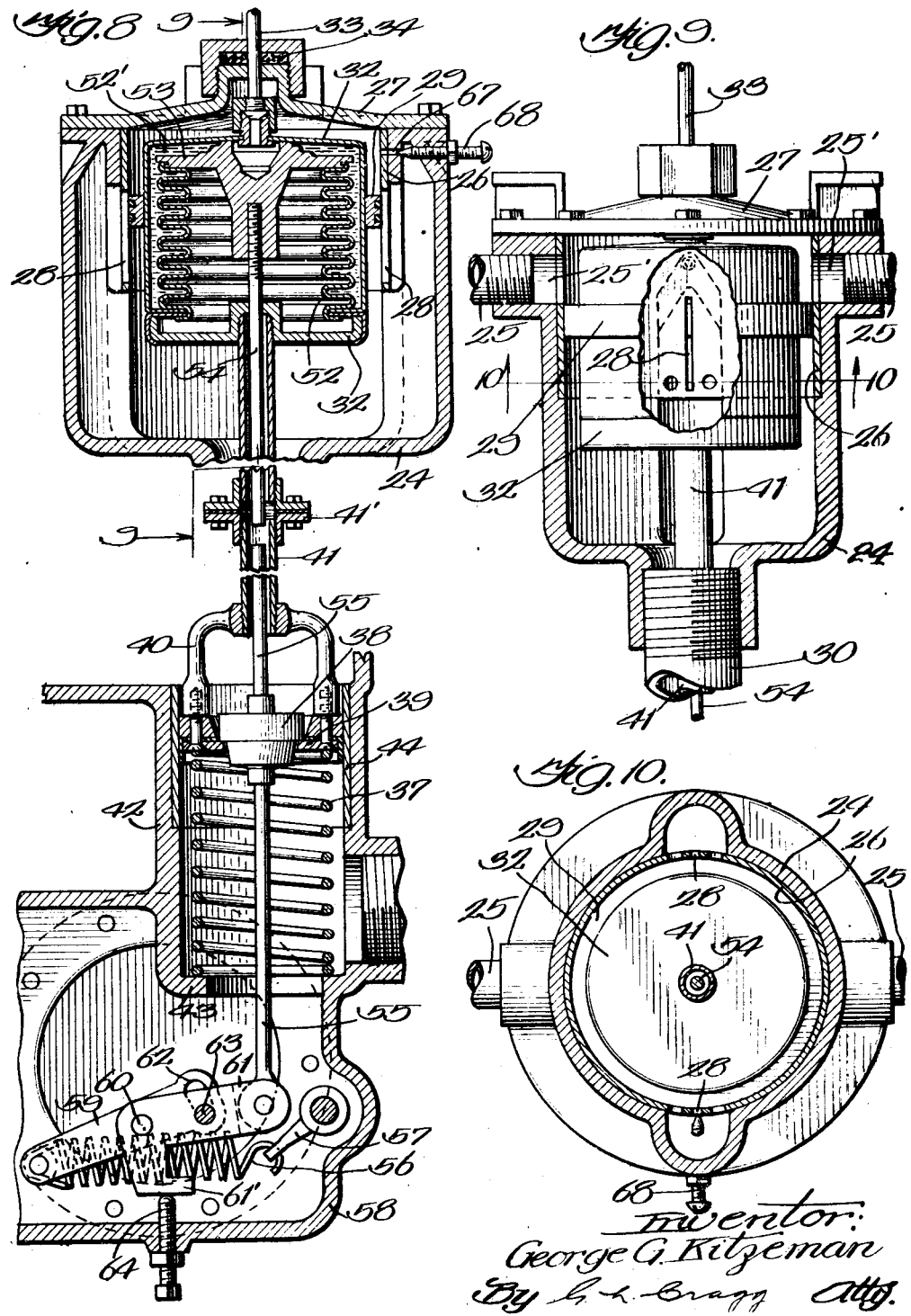

Patented Dec. 27, 1927.

1,654,175

UNITED STATES PATENT OFFICE.

GEORGE G. KITZEMAN, OF CHICAGO, ILLINOIS.

WATER HEATER.

Application filed December 7, 1925. Serial No. 73,778.

My invention relates to water heaters employing water heating gas burners.

The invention has a number of advantageous characteristics among which are, the provision of a sinuous passage for the products of combustion passing from the burner to the chimney and such a location of the passage for the water to be heated with relation to this sinuous passage that the products of combustion will travel past the water passage at least twice, whereby the water may be heated to a greater extent than where the products of combustion travel past the water passage but once; the employment of a flue member whose wall is made hollow and has connections for admitting water, that is to be heated, thereto and discharging heated water therefrom; the provision of a baffle located in conjunction with the burner to direct products of combustion therefrom toward the water conveying passage in the hollow wall of the flue member; the provision of an opening in the aforesaid sinuous passage for the products of combustion, located at the top of the first branch of this passage for permitting gas to escape in the event that either or both the ignition and pilot burners are not ignited while gas is flowing therethrough, there being a valve for said opening and a valve for the water heating burner both so controlled by the flowing water, when the heater is put in use, as to close the valve for said opening and to open the valve for the heating burner; the provision of a valve structure for governing the flow of fuel to the water heating burner that is inclusive of two elements, one in the form of a seat and the other in the form of a valve, one of these elements being movable in an opening direction by flowing water, the other being movable in a closing direction by a thermo-motive device governed by the heat due to the water heating burner; the provision of a normally open valve governing the flow of fuel to the pilot burner and further and preferably momentarily opened by the flowing water when the heater is put into use; the provision of improved means for fixing the volume of air admitted to the heating burner for carburetion; and the employment of means whereby the valve that controls the admission of fuel to the water heating burner may be snapped closed when sufficiently nearly closed, as in the event of overheating occasioned by improper adjustments or overextended flow of water due, for example, to faucet or water pipe leakage.

The invention will be more fully explained in connection with the accompanying drawings in which Fig. 1 is a vertical sectional view illustrating the preferred embodiment thereof; Fig. 1ª is a sectional view, on a larger scale, of some of the parts shown in Fig. 1; Fig. 2 is a sectional plan view on line 2—2 of Fig. 1; Fig. 3 is a cross-sectional view, looking upwardly, on line 3—3 of Fig. 1; Fig. 4 is a sectional view on line 4—4 of Fig. 1; Fig. 5 is a front view of a part of the structure appearing in Fig. 4; Fig. 6 is a sectional view on line 6—6 of Fig. 1; Fig. 7 is a front view of the structure appearing in Fig. 6; Fig. 8 is a view, on a larger scale, illustrating some of the mechanism as it appears in Fig. 1, parts being broken away, and other parts being absent; Fig. 9 is a sectional view of part of the mechanism shown in Fig. 8 on line 9—9; and Fig. 10 is a cross-sectional view, looking from beneath, on line 10—10 of Fig. 9.

The water heater illustrated includes an inner flue 1 desirably formed of sheet metal in cylindrical shape and corrugated at its lower end. A jacket 2 surrounds the flue 1 and is laterally spaced apart therefrom, the elements 1 and 2 thus together constituting a flue member whose wall is hollow. The water to be heated is supplied to the interior of the hollow flue member 1—2 through a pipe 3 having an elbow connection 4 with the interior of said flue member near the bottom of this member. Other elbow connections 5 and 6 lead from the upper portions of the hollow flue member to convey heated water therefrom, the water being passed from the flue member 1—2 as it is required for use, as will more fully hereinafter appear. The said flue member has a base portion 7, preferably radially enlarged, which surrounds the support 8 for the water heating gas burner which is desirably of the usual form that includes a number of gas nozzles 9, carried by said support. This support is carried by the pedestal rods 10 which also carry the base portion 7 of the flue member 1—2. This flue member is open at its bottom as well as its top and has communication with the external air which is admitted to said flue member for intermixture with the flowing gas when the heater is in use. The burner support 8 is formed with an annular passage 11 that receives gas supplied to the pipe 12 and from which gas is supplied to the units 9. Air finds its way from beneath the support 8 and around its edges into proximity with the burner units 9 where it is carbureted by the gas. The volume of air thus admitted for carburetion is regulated by an annular shelf 13 having a depending rim 14 formed at intervals with upright slots 15. The threaded stems of assembling bolts 16 are passed through these upright slots into the base portion 7 of the flue member 1—2, the heads of these bolts engaging the rim 14 to hold the shelf 13 in selected position. This shelf extends across the annular space or opening that intervenes between the edge of the support 8 and the surrounding flue base 7. The shelf desirably laps the support 8 and, by being lifted or lowered, cooperates with said support to determine the volume of air flowing between these two elements into said flue member.

A baffle 17, preferably in the form of an inverted cone, that is coaxial with the flue member 1—2, is located above the water heating burner in position to direct products of combustion from the burner toward and against the inner surface of the flue member.

A cup shaped element is employed that is inclusive of a cylindrical body portion 18 which constitutes a second flue member. This flue member 18 surrounds and is laterally spaced apart from the flue member 1—2. The top wall 18' forms with the flue member 18 the cup shaped element and is spaced apart from the upper end of the flue member 1—2. The flue 18 and its top wall 18' are double walled with heat insulating material between the walls. The cup end wall 18' is provided with a by-pass opening 19 which may be opened or closed by means of a valve 20, as will hereinafter appear, this valve being open when the heater is not in use in order that residue products of combustion and any gas that flows from the burners, when unignited, may pass directly to the stack 22. When the heater is in use, the valve 20 is closed, products of combustion then passing upwardly through the flue member 1—2 and downwardly into the space that laterally intervenes between this flue member 18. A third flue member 23 surrounds and is laterally spaced apart from the flue member 18 and desirably also constitutes the casing of the heater. The bottom of the flue member 18 is in communication with the flue member 23 so that products of combustion may pass into the latter flue member to the stack 22, the flue member 23 being spaced apart from the flue wall 18'. The flue member 1—2, by having its wall hollow and being connected for receiving and discharging water thereinto and therefrom, defines a passage for the flowing water which intervenes between the column of rising products of combustion, passing through the flue member 1—2 and the annular column of products of combustion passing downwardly between the flue member 1—2 and the flue member 18, whereby the water is nearly doubly heated.

Water is taken for use from the flue member 1—2 through a jacket 24 which is connected, at its upper end, by pipes 25 with the elbows 5 that are at the upper end of said member. This jacket carries an upright cylinder 26 at its upper end, the piping 25 discharging into the upper end of said cylinder through the ports 25'. The cylinder is sealed at its upper end by means of a cap plate 27. The cylinder is open at its bottom end and is formed with weirs 28 in its cylindrical wall. A piston 29 is in fluid-tight sliding engagement with the inner surface of the cylinder and is movable to vary the effected extent of the weirs 28. The water flows downwardly through the weirs into the pipe 30 which is in communication with the interior of the jacket 24, the water continuing to flow from the pipe 30 through the house pipes 31 that lead to various faucets. The flow of water into the heater is established whenever a faucet is opened and is occasioned by the city pressure exerted upon the water that is flowing into the heater through the pipe 3. The extent to which the piston 29 is lowered depends upon the volume and consequent pressure of water that is caused to flow by the faucets. The piston is inclusive of a jacket 32 which carries the cylinder engaging portion 29 and encloses certain parts to be hereinafter described. Said jacket also carries a valve actuating rod 33 at its upper end. This rod passes through a stuffing box 34 carried by the jacket 24, the upper end of the rod 33 passing into a sleeve 35 which carries the valve 20. The rod is in sliding relation with said sleeve. A screw 36 is screwed in the upper end of said sleeve and constitutes an abutment for said rod. When the piston is in its uppermost position, a position in which it is placed by the spring 37, when the heater is idle, as will more fully hereinafter appear, the rod 33, by engaging the abutment screw 36, lifts the valve 20 in order that residue products of combustion and unignited gas may pass directly from the flue member 1—2, through the opening 19, into the stack 22, as hitherto stated. When the heater is put into use by the opening of a faucet, the piston descends against the force of the spring 37 carrying with it the rod 33 to permit the valve 20 to close, whereupon the products of combustion pass through the three flues, as hitherto described.

The flow of gas or fuel to the gas nozzles 9 is regulated by a device that is inclusive of a valve 38 and a valve seat 39. One of these valve elements, preferably the valve seat, is coupled with the jacket portion 32 of the cylinder, as by means of a stirrup 40 assembled with the valve seat at its ends and with the tube 41 at its base. The spring 37 is housed in a portion 42 of the piping that communicates with the water heating burner, the lower end of this spring being bottomed on a shoulder 43 and the upper end pressing against the bottom of the valve seat 39 that is in the nature of a piston sliding within a cylinder 44 that is housed by the piping portion 42. When water is caused to flow into the heater, the piston 29 is depressed to depress the valve seat 39 against the force of the spring 37. The valve 38 has its position with reference to its seat governed by the heat so as to regulate the flow of gas. In the event of abnormal conditions, the valve may move with the valve seat 39 while fully seated thereon to prevent flow of gas to the water heating burner. As the tube 41 moves downwardly, its coupling flange 41' engages and escapes one end of the bell crank lever 45 whose other end engages the valve stem 46 of a valve 47 that governs the flow of gas to the pilot burner 21. This valve 47 is normally open, but when its stem 46 is momentarily pressed upon by the momentarily operated bell crank lever 45, it is momentarily opened to a further extent so as to momentarily increase the volume of gas flowing through the pilot burner to momentarily create a larger pilot flame to more effectively ignite the gas issuing from the gas nozzles 9. The valve 47 is located in a pipe 48 which is tapped from the gas pipe 49 leading to the pipe portion 42. A main cut-off valve 50 is provided in the pipe 49 to cut off the flow of gas to the pipe portion 42 and a cut-off valve 51 is provided in the pipe 48 to cut off the flow of gas to the pilot burner.

When the heater is in operation, the piston portion 32 becomes heated and transmits heat to the thermo-motive fluid 52' that surrounds the bellows-like motive element 52 housed therein. This fluid expands on rising temperature and contracts on falling temperature. In expanding, the fluid has compressing action upon said bellows-like element and in contracting, it permits the bellows-like element to expand to or toward its idle or normally expanded shape. The thermo-motive element 52 is anchored at its lower end to the bottom end of the piston member 32 and is connected at its upper end with a vertically movable cross head 53. A rod 54 is carried by and depends from the cross head and extends into the tube 41 so as to be moved up and down as the bellows-like element expands and contracts, due to variation in the temperature to which the fluid 52' is subjected. The piston 32 and the rod 34 move downwardly together when the heater is put into use. When the rod 54 initially engages the valve rod 55, the gas passage between the valve and its seat is at a maximum. When the heat has sufficiently increased, the rod 54 will descend due to the action of the elements 52 and 52', sufficiently to move the valve rod 55 whereby the valve 38 is moved in a closing direction.

When the heater is idle, the valve 38 is held in its uppermost position by means of the spring 37 acting through the seat 39, the seat and valve then being in closing engagement. When the heater is put to use, the valve 38 is positioned by the spring 56. This spring is anchored at one end to the anchorage 57 carried by and within the casing extension 58 of the piping portion 42. An arm 59 is mounted to turn, between its ends, upon the pin 60 carried by the link 61. The other end of the spring 56 is connected with the left hand or outer end of the arm 59. The other end of this arm is formed with an arcuate slot 62 concentric with the pin 60 and receiving the stationary pin 63 upon which the link 61 is pivoted. The rod 55 which carries the valve 38 is extended downwardly below this valve and is in pivotal connection with the outer or right hand end of the link 61. When the parts are in the position illustrated in Fig. 8, the spring 56 pulls upon the arm 59 counter-clockwise. The lower margin of the slot 62 is pressed upwardly against the pin 63 so that the extension 61' of the link 61 is pressed upon the abutment screw 64. When the valve 38 is in its uppermost position, upon the heater being first put into use, the flow of gas is initially regulated by the flowing water which operates through the piston element 29 to depress the seat 39 from the valve 38 to a point defined by the calibrated space normally or idly existing between the rods 54 and 55, this space being desirably regulated by the coupling 41' whose members are respectively in right and left hand threaded connection with the portions of the tube 41 coupled thereby. When the flowing gas is ignited by the pilot burner and the temperature has sufficiently risen, the thermo-motive element 52 depresses the cross head 53 to depress the valve 38 to reduce the flow of gas. The valve 38 rises and falls, in the normal operation of the heating, to supply gas in proper quantity to heat the water to the predetermined degree, the amount of gas flowing also varying with the quantity of water which is being withdrawn for use.

When the valve 38 descends, the rod 55 turns the link 61 and the arm 59, as a unit, upon the pin 63 in a clockwise direction. When temperature rises above the predetermined maximum, under such abnormal conditions hitherto recited, for example, the left hand end of the arm 59 is raised sufficiently to bring the axis of the spring 56 above the axis of the pin 63. Said spring 56 will then turn the arm 59 upon the pin 60 until the upper end of the arcuate slot 62 reaches the pin 63. The arm 59 and the link 61 are again coupled as a unit and the clockwise movement thereof by the spring 56 is extended thereby snapping the valve 38 shut. Gas can not thereafter be used to heat the water until the flow of water has been stopped to allow spring 37 to place the valve seat 39 and valve 38 in their uppermost positions, in which operation the axis of spring 56 is again placed below the center of pin 63. The temperature at which the valve 38 will snap shut is determined by the position of the anchored end of the spring 56. I make the anchorage 57 adjustable by carrying it upon a pin 65 that passes through and turns upon a wall of the casing portion 58. An index arm 66 is fixed upon the outer end of said pin. By turning this arm, the pin is turned to adjust the direction of the spring to adjust the temperature at which the valve will snap shut. A by-pass 67 is provided for permitting greater discharge of water above the piston as the piston is being restored and to permit water to pass by the piston whenever the flow is abnormally large. This by-pass is adjustable in size by the screw 68.

A pipe 69 communicates with the space between the flue portions 1 and 2 near the bottom thereof by means of an elbow 70. A valve 71, when opened, establishes communication with the drain pipe 72 in order that the sludge accumulation and settling between the portions 1 and 2 may be discharged.

Changes may be made without departing from the invention.

Having thus described my invention, I claim:—

1. A water heater including a flue; a second flue, in the form of an inverted cup, surrounding the first flue and spaced apart therefrom at the upper ends of said flues, and a third flue surrounding and laterally spaced apart from the second flue and communicating with the lower end of the second flue; a water heating gas burner positioned to have products of combustion pass therefrom through the first aforesaid flue; a passage for the water to be heated positioned to be subject to the heat of the products of combustion rising from the burner and passing between the first and second flues; a by-pass opening in the top wall of said cup; a valve for said opening and open when the heater is not in use; a valve for the water heating gas burner and closed when the heater is not in use; and means, operated by the water flowing when the heater is in use to close the first valve and open the second valve.

2. A water heater including two laterally spaced apart flues in communication at their upper ends; a water heating gas burner positioned to have products of combustion pass therefrom initially through one of said flues, the second flue being closed at its upper end and there also spaced apart from the first flue whereby products of combustion are directed to the lateral space between said flues; a third flue laterally spaced apart from the second flue and communicating with the lower portion of the second flue; a passage for the water to be heated positioned to be subjected to the heat of the products of combustion passing through the heater; a valve for the water heating gas burner and closed when the heater is not in use; a valve for a by-pass opening formed in the closed upper end of the second flue and open when the heater is not in use; and means, operated by the water flowing when the heater is in use, to open the first valve and close the second valve.

3. A water heater including a passage for water having connections for admitting water thereto and discharging heated water therefrom; a water heating burner; a device for controlling the flow of fuel to said burner and inclusive of one element in the form of a valve and a second element in the form of a seat for the valve, these elements being located in piping that leads to said burner; means whereby one of said elements is adjusted to an open position by water admitted to the heater when the heater is in use; and thermo-motive means subject to the heat of the water and operatively connected with the other of said elements whereby this element is adjustable toward and from the first.

4. A water heater including a passage for water having connections for admitting water thereto and discharging heated water therefrom; a water heating burner; a device for controlling the flow of fuel to said burner and inclusive of one element in the form of a valve and a second element in the form of a seat for the valve, these elements being located in piping that leads to said burner; means whereby one of said elements is adjusted to an open position by water admitted to the heater when the heater is in use; a cylinder admitting water supplied to the heater; a piston in said cylinder subject to water admitted to the heater and connected with one of the aforesaid elements to adjust it to an open position when the heater is in use; and thermo-motive means subject to the heat of the water and operatively connected with the other of said elements whereby this element is adjustable toward and from the first.

5. A water heater including a passage for water having connections for admitting water thereto and discharging heated water therefrom; a water heating burner; a device for controlling the flow of fuel to said burner and inclusive of one element in the form of a valve and a second element in the form of a seat for the valve, these elements being located in piping that leads to said burner; means whereby one of said elements is adjusted to an open position by water admitted to the heater when the heater is in use; a cylinder admitting water supplied to the heater; a piston in said cylinder subject to water admitted to the heater and connected with one of the aforesaid elements to adjust it to an open position when the heater is in use; and thermo-motive means, carried by the piston, subject to the heat of the water and operatively connected with the other of said elements whereby this element is adjustable toward and from the first.

6. A water heater including a passage for water having connections for admitting water thereto and discharging heated water therefrom; a water heating burner; a device for controlling the flow of fuel to said burner and inclusive of one element in the form of a valve and a second element in the form of a seat for the valve, these elements being located in piping that leads to said burner; means whereby one of said elements is adjusted to an open position by water admitted to the heater when the heater is in use; and thermo-motive means, coupled with the aforesaid means, subject to the heat of the water and operatively connected with the other of said elements whereby this element is adjustable toward and from the first.

7. A water heater including a passage for water having connections for admitting water thereto and discharging heated water therefrom; a water heating burner; a device for controlling the flow of fuel to said burner and inclusive of one element in the form of a valve and a second element in the form of a seat for the valve, these elements being located in piping that leads to said burner; means whereby one of said elements is adjusted to an open position by water admitted to the heater when the heater is in use; and means whereby said gas regulating device is jointly controlled by water admitted to the heater and the heat of the water.

8. A water heater including a passage for water having connections for admitting water thereto and discharging heated water therefrom; a water heating burner; an automatically operating device for controlling the flow of fuel to said burner and inclusive of one element in the form of a valve and a second element in the form of a seat for the valve, these elements being located in piping that leads to said burner; means whereby one of said elements is adjusted to an open position by water admitted to the heater when the heater is in use; and automatic mechanism for snapping one of the aforesaid valve elements closed against the other when these elements are in close proximity.

9. A water heater including a passage for water having connections for admitting water thereto and discharging heated water therefrom; a water heating burner; an automatically operating device for controlling the flow of fuel to said burner and inclusive of one element in the form of a valve and a second element in the form of a seat for the valve, these elements being located in piping that leads to said burner; means whereby one of said elements is adjusted to an open position by water admitted to the heater when the heater is in use; thermo-motive means subject to the heat of the water for adjusting one of the aforesaid elements toward and from the other; and automatic mechanism for snapping one of the aforesaid elements against the other when these elements are in close proximity.

10. A water heater including a passage for water having connections for admitting water thereto and discharging heated water therefrom; a water heating burner; an automatically operating device for controlling the flow of fuel to said burner and inclusive of one element in the form of a valve and a second element in the form of a seat for the valve, these elements being located in piping that leads to said burner; means whereby one of said elements is adjusted to an open position by water admitted to the heater when the heater is in use; thermo-motive means subject to the heat of the water for adjusting one of the aforesaid elements toward and from the other; and automatic mechanism operating upon said element that is controlled by the thermo-motive device to snap it against the other when these elements are in close proximity.

In witness whereof, I hereunto subscribe my name.

GEORGE G. KITZEMAN.